United States Patent
Jaramillo et al.

(10) Patent No.: US 6,178,477 B1
(45) Date of Patent: *Jan. 23, 2001

(54) METHOD AND SYSTEM FOR PSEUDO DELAYED TRANSACTIONS THROUGH A BRIDGE TO GUARANTEE ACCESS TO A SHARED RESOURCE

(75) Inventors: Ken Jaramillo, Phoenix; Carl Knudsen, Gilbert, both of AZ (US)

(73) Assignee: VLSI Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/947,650

(22) Filed: Oct. 9, 1997

(51) Int. Cl.[7] ................................................. G06F 13/00
(52) U.S. Cl. ..................... 710/129; 710/241; 710/242; 710/118; 710/125; 710/128
(58) Field of Search ........................ 395/308; 710/241, 710/242, 118, 125, 128

(56) References Cited

U.S. PATENT DOCUMENTS

| | | | |
|---|---|---|---|
| 5,471,590 | * 11/1995 | Melo et al. | 710/108 |
| 5,596,729 | * 1/1997 | Lester et al. | 395/308 |
| 5,611,058 | * 3/1997 | Moore et al. | 395/309 |
| 5,649,161 | * 7/1997 | Andrade et al. | 395/494 |
| 5,673,414 | * 9/1997 | Amini et al. | 395/473 |
| 5,682,484 | * 10/1997 | Lambrecht | 395/308 |
| 5,682,512 | * 10/1997 | Tetrick | 395/412 |
| 5,701,422 | * 12/1997 | Kirkland, Jr. et al. | 395/309 |
| 5,787,265 | * 7/1998 | Leshem | 395/293 |
| 5,802,324 | * 9/1998 | Wunderlich et al. | 395/281 |
| 5,805,844 | * 9/1998 | Gustin et al. | 395/309 |
| 5,870,567 | * 2/1999 | Hausauer et al. | 710/101 |

* cited by examiner

Primary Examiner—Ayaz R. Sheikh
Assistant Examiner—Rupal D. Dharia
(74) Attorney, Agent, or Firm—Wagner, Murabito & Hao LLP

(57) ABSTRACT

The present invention comprises a system for implementing pseudo delayed transactions through a bridge in order to guarantee access to a shared device. The system of the present invention functions in a computer system having a plurality of busses, including a first bus on one side of a bridge and a second bus on another side of the bridge. A first initiator device and a second initiator device are coupled to the first bus. The first and second initiator devices are both adapted to request ownership of the first bus and receive a respective first and second grant signal responsive thereto. A target device is coupled to the second bus. The bridge is coupled to the first bus and the second bus. The bridge is adapted to implement data transactions between the target device and the first device or the second device. The bridge is further adapted to support a pseudo delayed transaction for the first or second device, wherein the pseudo delayed transaction is supported without requiring the storage of address or command/byte enable information, such that the first and second device are both guaranteed access to the target device.

23 Claims, 5 Drawing Sheets

METHOD AND SYSTEM FOR PSEUDO DELAYED TRANSACTIONS THROUGH A BRIDGE TO GUARANTEE ACCESS TO A SHARED RESOURCE

TECHNICAL FIELD

The present invention pertains to the field of computer system bus architectures. More particularly, the present invention relates to a bridge retry mechanism which efficiently implements delayed transactions between initiating devices and shared target devices.

BACKGROUND ART

A bus architecture of a computer system conveys much of the information and signals involved in the computer system's operation. In a typical computer system, one or more busses are used to connect a central processing unit (CPU) to a memory and to input/output elements so that data and control signals can be readily transmitted between them. When the computer system executes its programming, it is imperative that data and information flow as fast as possible in order to make the computer system as responsive as possible to the user. With many peripheral devices, such as graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates its transaction (e.g., data transfer) with a "target" or slave device (e.g., main memory 104). When the data transaction is complete, the PCI agent relinquishes ownership of the PCI bus 112, allowing arbiter 106 to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification—Revision 2.1). Where each of PCI agents 114–124 are high performance, well designed devices, data transfer rates of up to 528 Mbytes per second can be achieved (e.g., PCI bus 112 operating at 66 MHz).

When the number of PCI agents on a PCI bus is large, total data transfer bandwidth can quickly be consumed. The computer system incorporating such a PCI bus can be significantly slowed as the devices on the PCI bus contend for bandwidth. In addition, with a large number of PCI agents coupled, the ability to add still more PCI agents can be limited by the electrical properties of bus, or the lack of available expansion connectors. In such a case, system designers often incorporate one or more "bridges".

Generally, a bridge is a device designed to link two separate bus systems. Bridges can be used to connect similar (e.g., PCI to PCI bridge) or dissimilar (e.g., PCI to ISA bridge) bus systems. A bridge functions by transferring data from devices on one of the coupled busses to devices on the other.

In the case of two separate PCI busses, a PCI to PCI bridge (e.g., PCI bridge 124) is used to communicatively link PCI devices on one PCI bus to the PCI devices the other PCI bus. A PCI bridge electrically separates devices on one PCI bus from devices on the other while still allowing them communicate with each other. This solves problems with respect to, for example, too many electrical loads on one PCI bus, incompatible bus latency requirements between devices, or the limited number of PCI expansion connectors supported. The PCI bridge includes the necessary logic required to transfer data signals from one PCI bus to the other. Hence, although the PCI bridge has the above advantages, the necessary logic included in the PCI bridge adds latency and delay to data transactions which cross the PCI bridge.

In the case of a PCI to ISA or some other type of bus, the bridge (e.g., ISA bridge 118), in addition to data transfer logic, includes logic for translating data transactions from one bus protocol to another, in this case PCI to ISA and ISA to PCI. The ISA bridge solves the same sorts of problems the PCI bridge solves, however, since the ISA bus runs much slower than the PCI bus, the ISA bridge, as with other types of bridges, typically functions much slower and has much greater effective latency than the devices on the PCI bus (e.g., PCI bus 112).

To deal with this latency, prior art bridges (e.g., PCI bridge 124 and ISA bridge 118) support delayed transaction protocols. Delayed transaction protocols (or simply, delayed transactions) are defined by the PCI specification. Delayed transactions allow a more efficient utilization of PCI bus bandwidth by providing for a more efficient flow of data between an initiator device one side of the PCI bridge and a slower target device on the other. Delayed transactions allow ISA bridge 118, for example, to issue a retry to the initiator (e.g., CPU 102) if the data transaction will take an inordinate amount of time to complete. This allows the ISA bridge 118 to work on completing the data transaction with the target device while freeing PCI bus 112 for use by another initiator. In the meantime, ISA bridge 118 works on the data transaction, for example, fetching the requested data from a CD-ROM coupled to the ISA bus and loading its internal read FIFO (first-in-first-out) buffer. When the retried initiator subsequently reattempts its access, ISA bridge 118 supplies the requested data.

There is a problem, however, in that ISA bridge 118 (as with other typical prior art bridges) retries all subsequent initiators seeking access to devices on the ISA bus while fetching the requested data from the first initiator. Consequently, there exists the possibility for one or more initiators to be "starved" from obtaining access to devices residing on the ISA bus. For example, if initiator 114 (motion video device) writes a block of data to a shared memory device on the ISA bus on the other side of ISA bridge 118, ISA bridge 118 might then consider itself busy (e.g., its internal write FIFO fills up) and retry all further PCI cycles until its internal write FIFO empties.

If a different initiator, for example, initiator 120 (audio device) is granted PCI bus 112 right after initiator 114 and attempts to access any device residing on the ISA bus, it is retried because the internal write FIFO of ISA bridge 118 is still full. Initiator 114 reattempts its access at just the right time to find ISA bridge 118 available (e.g., its write FIFO has been emptied by writes on the ISA bus to the memory device). So initiator 114 again writes a block of data to the shared memory device via ISA bridge 118, again filling the internal write FIFO. Initiator 120 again is granted PCI bus 112 but is retried because initiator 114 has filled the write FIFO of ISA bridge 118. In this manner, it is quite possible initiator 120 will be prevented from obtaining access to ISA bridge 118. This starvation can continue long enough for initiator 120 to lose data (e.g., internal FIFO to be over run). This is especially damaging for devices with internal FIFOs which must be filled or emptied on a regular basis. Such devices include, for example, USB (Universal Serial Bus) devices, IEEE 1394 Fire Wire devices, interfaces to LANs (local area network), and the like. The same scenario is possible for PCI read cycles, as well PCI write cycles.

The conventional prior art approach to solving this problem involves increasing the size of the read and write FIFOs in the bridge devices (e.g., ISA bridge 118) and to add support for multiple delayed transactions. Increasing the FIFO sizes involves using larger registers, larger buffers, etc, and more sophisticated logic to support multiple delayed transactions. Adding support for multiple delayed transactions involves adding support logic for saving initiator address and command/byte enable information. This allows a bridge to determine when an initiator reattempts an access from which the initiator was previously retried. As described above, upon an initial access attempt, a bridge will issue a retry to free the PCI bus while it works on completing the data transaction. As soon as that initiator's requested data is available and the initiator retries its previous access, the bridge, having saved that initiator's address and command/byte enable information, recognizes the access and presents the requested data to the initiator. In this manner, the bridge supports multiple devices by saving the initiator address and command/byte enable information for each initiator being "queued". This allows the bridge to subsequently execute each of the delayed transactions, using the saved address and command/byte enable information for each queued initiator, in sequence, as each previous transaction finishes.

The problem with this approach is that it is gate intensive and complicated. Increasing the size of the read and write FIFOs and storing the address and command/byte enable information for multiple initiators consumes a large amount of circuitry. The implementing logic (e.g., gates, connect lines, registers, etc.) consumes a relatively large amount of silicon area in comparison to the other functions included within a bridge. Consequently, the prior art approach is expensive.

Thus, what is required is a system which supports delayed transactions without incurring the increased complexity and expense associated with the prior art. The required system should allow fair access between devices on either side of a bridge. The required system should not allow a device to be starved of access to other devices on the other side of the bridge. In addition, the required system should confer its benefits without requiring a large amount of implementing logic. The present invention provides a novel solution to the above requirements.

DISCLOSURE OF THE INVENTION

The present invention is a novel method and system which supports delayed transactions without incurring the increased complexity and expense associated with the prior art. The system of the present invention allows fair access to devices on one side of a bridge by devices on the opposite side of the bridge. The system of the present invention does not allow a device on one side of the bridge to be starved of access to devices on the other side of the bridge. In addition, the system of the present invention provides its benefits without requiring a large amount of implementing logic.

In one embodiment, the present invention comprises a system for implementing pseudo delayed transactions through a bridge in order to guarantee access to a shared target device. The system of the present invention functions in a computer system having a plurality of busses, including a first bus on one side of a PDT (pseudo delayed transaction) bridge and a second bus on another side of the PDT bridge. The first bus is a PCI bus. A first initiator device and a second initiator device are coupled to the PCI bus. The first and second initiator devices are both adapted to request ownership of the PCI bus and receive a respective first and second grant signal responsive thereto. A target device is coupled to the second bus. The PDT bridge is coupled to the PCI bus and the second bus. The PDT bridge is adapted to implement data transactions between the target device and the first device or the second device. The PDT bridge is further adapted to support a pseudo delayed transaction by the first or second device such that the first and second initiator devices are guaranteed access to the target device.

For example, if the PDT bridge is busy executing a current transaction for the first initiator device when accessed for a transaction by the second initiator device, the bridge will queue the second initiator device for a pseudo delayed transaction, finish the current transaction with the first device, and then ensures that the pseudo delayed transaction with the second device is executed when the second device reattempts its access. In this manner, the PDT bridge of the present invention guarantees access to the shared target device by the initiator devices.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

BEST MODE FOR CARRYING OUT THE INVENTION

Reference will now be made in detail to the preferred embodiments of the invention, a method and system for pseudo delayed transactions through a bridge to guarantee access to a shared resource, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises a novel method and system for supporting delayed transactions without incurring the increased complexity and expense associated with the prior art. The system of the present invention allows fair access to devices on one side of a bridge by devices on the opposite side of the bridge. The system of the present invention does not allow a device on one side of the bridge to be starved of access to devices on the other side of the bridge. In addition, the system of the present invention provides its benefits without requiring a large amount of implementing logic. The present invention and its benefits are further described below.

Figure 1:
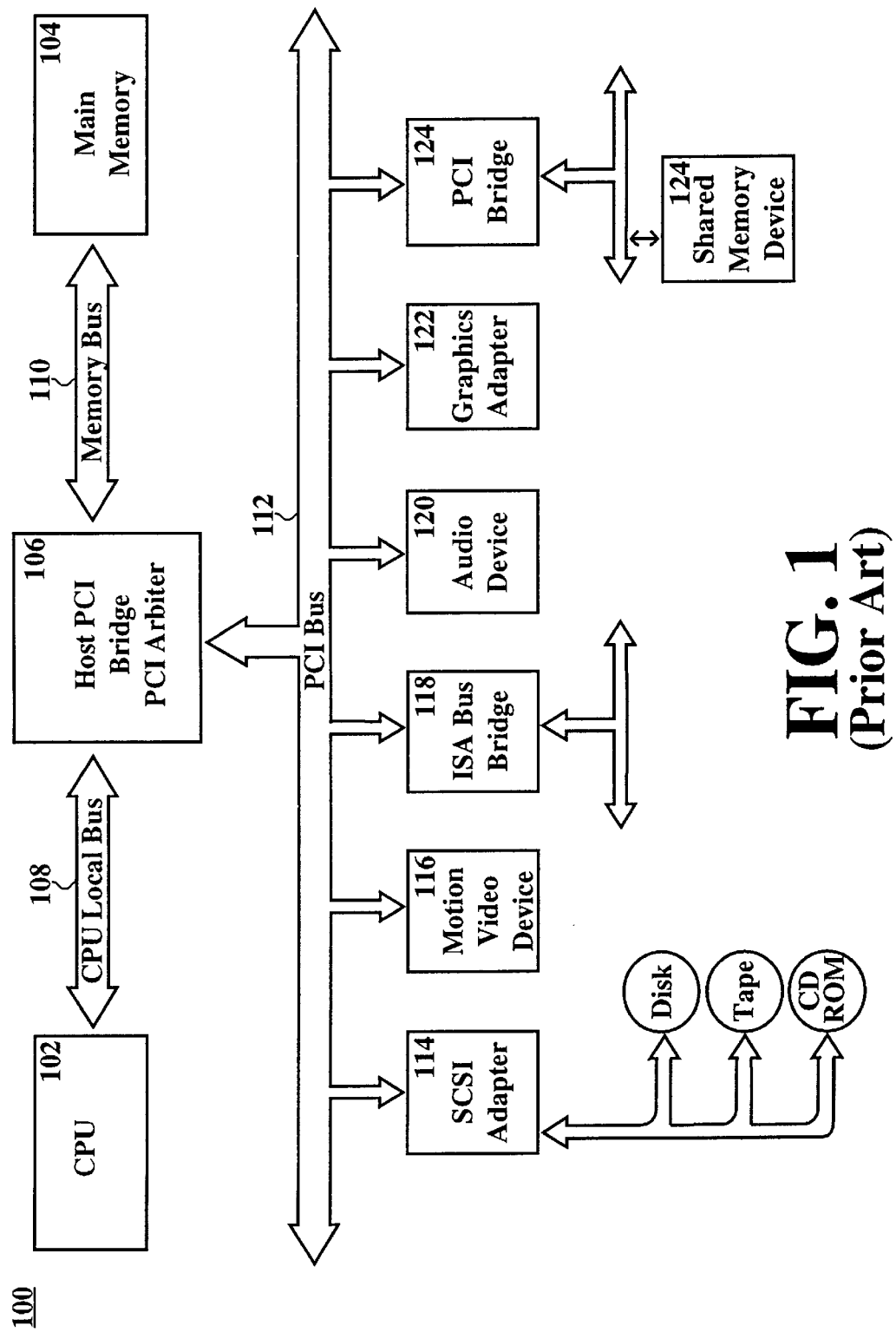
FIG. 1 shows a typical PCI bus architecture of the prior art.
Figure 2:
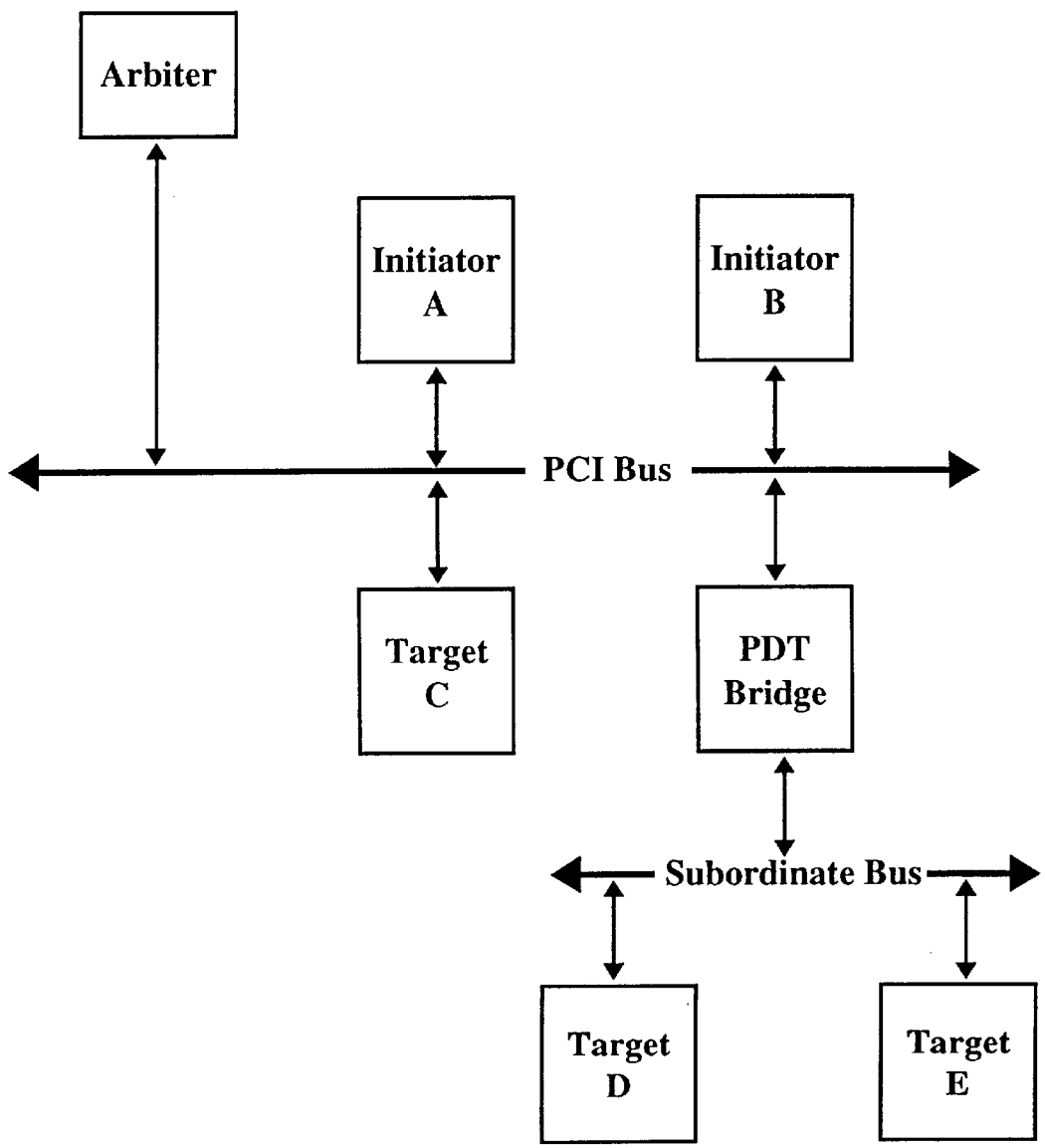
FIG. 2 shows a diagram of a dual bus system in accordance with one embodiment of the present invention.

Referring to FIG. 2, a diagram of a system 200 in accordance with one embodiment of the present invention is shown. System 200 includes a PCI bus and a subordinate bus. An arbiter, an initiator A and an initiator B are coupled to the PCI bus. A target D and a target E are coupled to the subordinate bus. A PDT (pseudo delayed transaction) bridge is coupled to both the PCI bus and the subordinate bus. The PDT bridge functions by communicatively linking PCI agents (e.g., initiator A, initiator B, etc.) on the PCI bus with devices on the subordinate bus (e.g., target D, target E, etc.)

Initiators A and B, in accordance with the PCI specification, may independently request PCI bus ownership from the arbiter. Where there are simultaneous requests for ownership, the arbiter arbitrates between initiators A and B and any other initiators to determine which will be granted ownership. The arbiter signals the winning initiator by asserting that initiator's grant signal. Upon reception of its grant signal, the winning initiator initiates its transaction with a targeted device (e.g., target C). When the target device is a device residing on the subordinate bus (e.g., target E), the initiator executes its data transaction via the PDT bridge. When the data transaction is complete, the initiator relinquishes ownership of the PCI bus, allowing the arbiter to reassign the PCI bus to another requesting initiator (e.g., initiator B).

When the data transaction with the target device on the subordinate bus (e.g., target E) is a high latency data transaction (e.g., will consume more than 16 PCI clock cycles), the PDT bridge, in accordance with the PCI specification, issues a retry, forcing the initiator to release the PCI bus. This frees the PCI bus for initiator B. Subsequently, initiator B is free to initiate and execute data transactions with devices on the PCI bus (e.g., target C), however, should initiator B attempt an access with a device on the subordinate bus (e.g., target D) it may receive a retry due to the fact that the PDT bridge is busy executing the transaction of initiator A.

With some prior art bridge devices, there exists the possibility that initiator B will be starved of access to devices on the subordinate bus. With other prior art bridge devices, in order to prevent starvation problems, expensive and complex circuitry is included to implement multiple delayed transactions in accordance with the PCI specification. With the PDT bridge of the present invention, however, the access of initiator B to devices on the subordinate bus is guaranteed through the use of pseudo delayed transactions.

The PDT bridge of system 200 implements pseudo delayed transactions with initiators on the PCI bus in order to "queue" access to devices on the subordinate bus. For example, where initiator A initiates a data transaction with target E via the PDT bridge and this data transaction is a high latency data transaction, the PDT bridge will issue a retry to initiator A to free the PCI bus. The PDT bridge then continues processing initiator A's transaction by , for example, fetching the requested data from target E. Consequently, when initiator B attempts an access to a device on the subordinate bus, initiator B is processed for a pseudo delayed transaction. The PDT bridge queues initiator B's access pending completion of initiator A's transaction. Hence, when initiator A's transaction is completed, the PDT bridge retries other initiators in order to accept the retried transaction from initiator B. In so doing, the PDT bridge guarantees access to the subordinate bus for each initiator.

In this manner, system 200, in accordance with the present invention, implements pseudo delayed transactions for the initiators on the PCI bus. It should be appreciated that pseudo delayed transactions are not delayed transactions as described by the PCI specification. Rather, the pseudo delayed transactions of the present invention provide the functionality of prior art "PCI specification type" delayed transactions without incurring the overhead penalties.

Pseudo delayed transactions are implemented by queuing access attempts to target devices on the other side of the PDT bridge. When the PDT bridge is busy processing a previous access attempt (e.g., from initiator A) such that the bridge cannot handle a current access attempt (e.g., from initiator B), it retries the current access and latches the instant state of the arbiter's grant signal outputs. The PDT bridge does not store the address or command/byte enable signals, as with the prior art. Consequently, a large amount of complexity, expense, etc. is saved and the resulting design of the PDT bridge is significantly smaller with respect to prior art bridges. The PDT bridge latches enough information to enable it to determine when the retried current initiator (e.g., initiator B) reattempts its access to the target on the subordinate bus. The PDT bridge disregards whether this initiator is reattempting its previous access or is attempting a completely new, unrelated access (e.g., the determination of which requires storage of address and command/byte enable information). Rather, in accordance with the present invention, the PDT bridge guarantees that the first initiator which attempted an access while the PDT bridge was busy will be able to subsequently acquire access to and transfer data via the PDT bridge.

Accordingly, after the PDT bridge latches the arbiter's grant signal outputs, it finishes the previous transaction from the previous initiator (e.g., initiator A). The PDT bridge then waits (e.g., a predetermined reasonable period of time, depending upon the specifics of system 200) until the first queued initiator reattempts its access, retrying all other initiators. When the first queued initiator reattempts its access, as recognized through the stored grant signal outputs, the PDT bridge accepts the necessary address and command/byte enable signals from this initiator and commences the transaction. It should be noted that the PDT bridge does not store the necessary address and command/byte enable information until the first queued initiator reattempts its access.

Thus, the present invention, by implementing pseudo delayed transactions, ensures that the starvation problems of the prior art are prevented. It should be appreciated that the system of the present invention supports multiple levels of pseudo delayed transactions. The present invention can queue more than one access attempt at a time. Increasing the number of devices supported in the queue adds much less supporting circuitry than increasing the number of devices supported through prior art delayed transactions. Since pseudo delayed transactions store the grant signal outputs of the arbiter as opposed to the address and command/byte enable information, supporting pseudo delayed transactions is much less expensive.

It should be appreciated, however, that although the present invention is described above as functioning with a PCI bus and a subordinate bus, the present invention can be implemented on a variety of bus systems suited to the particular requirements of a user. For example, the PDT bridge can function as a bridge between two PCI busses, or may function as a bridge between a PCI bus and a proprietary, non-industry standard, manufacturer specific bus. Hence, the present invention is not limited to functioning with only PCI busses.

Figure 3:
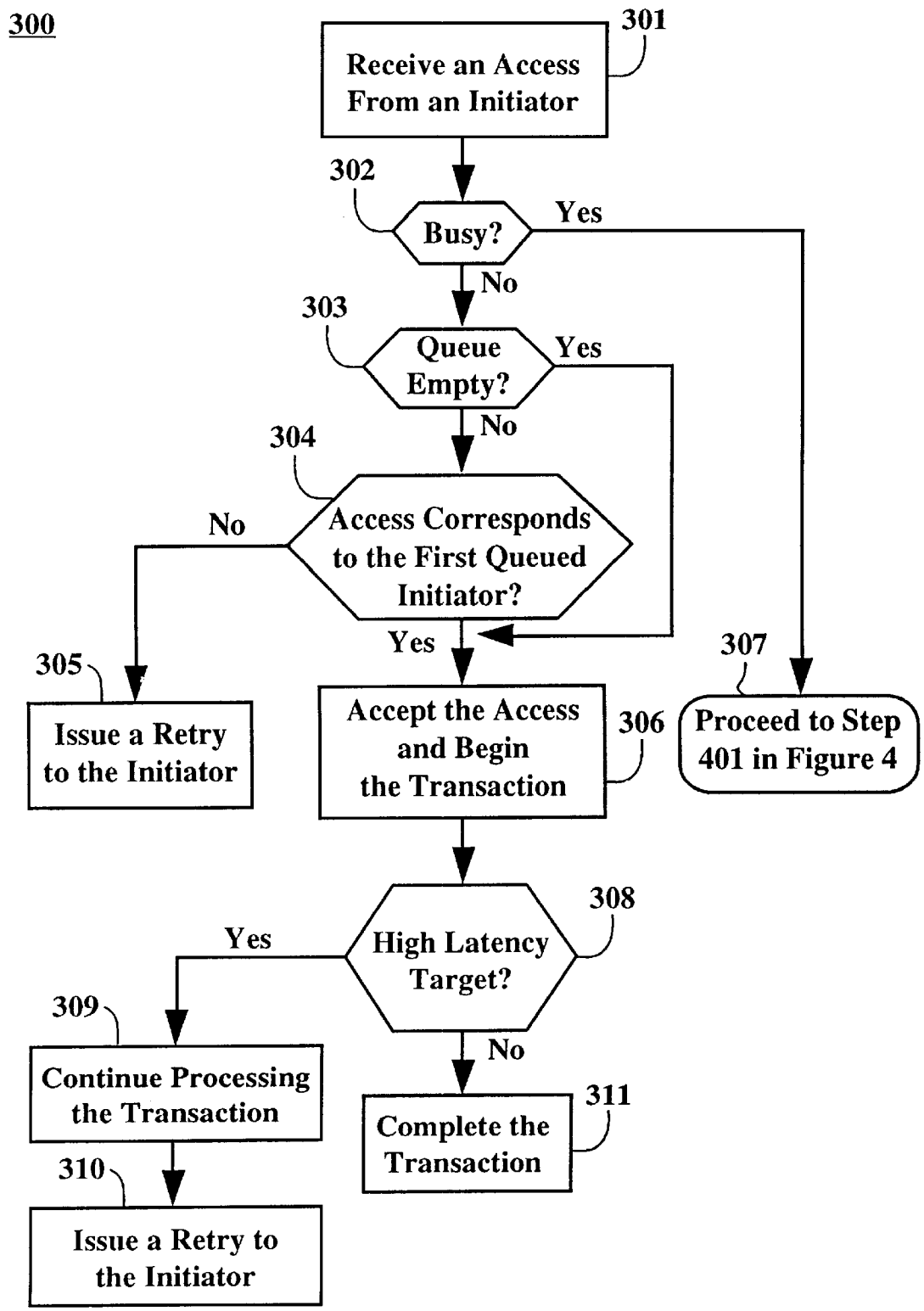
FIG. 3 shows a flow chart of the steps of a process in accordance with one embodiment of the present invention.

Referring now to FIG. 3, a flow chart of the steps of a process 300 in accordance with one embodiment of the present invention is shown. Process 300, in accordance with the present embodiment, illustrates the operation of the pseudo delayed transaction process as implemented with a PCI bus and a subordinate bus coupled via a PDT bridge (e.g., system 200 of FIG. 2). Process 300 begins in step 301 where a PDT bridge in accordance with the present invention receives an access from an initiator (e.g., initiator A).

In step 302, the PDT bridge determines whether it is busy processing an access from a previous initiator. If the PDT bridge is busy, process 300 proceeds to step 307, which, in turn, forwards process 300 to step 401 of FIG. 4 (described below). If the PDT bridge is not busy (e.g., the PDT bridge is idle or has completed processing a previous access attempt), process 300 proceeds to step 303.

In step 303, when the PDT bridge is not busy, the PDT bridge determines whether there are any initiators waiting in a queue for their respective pseudo delayed transactions using their respective grant signals. If there are, those initiators are given priority and process 300 proceeds to step 304. If not, process 300 proceeds directly to step 306.

In step 304, when the PDT bridge is not busy and there is at least one queued initiator, the PDT bridge determines whether the initiator of the access corresponds to the first (or only) queued initiator. As described above, the PDT bridge stores the grant signal outputs from the arbiter when accessed. Since each initiator has a unique grant signal, the PDT bridge recognizes which initiators are attempting access. If the current initiator corresponds to the first queued initiator, process 300 proceeds to step 306. If the current initiator does not correspond to the first queued initiator, process 300 proceeds to step 305.

In step 305, where the current initiator does not correspond to the first queued initiator, the PDT bridge issues a retry to the initiator. This forces the current initiator to relinquish the PCI bus and allows the first queued initiator a chance to acquire the PCI bus and reattempt its access.

In step 306, where the current initiator does correspond to the first queued initiator (or if the queue is empty), the PDT bridge accepts the access and begins the transaction. As described above, the PDT bridge accepts the necessary address and command/tbyte enable information required for the transaction and contacts the target device.

In step 308, the PDT bridge determines whether the target device is a high latency target device. If the transaction with the target has a latency of greater than 16 PCI clock cycles, the target is a high latency target. In the case of high latency, process 300 proceeds to step 309. If the transaction is not a high latency transaction, process 300 proceeds to step 311.

In step 308, in the case of high latency, the PDT bridge continues processing the transaction. In the case of a read transaction, the PDT bridge continues fetching data from the target to its internal read FIFO. In the case of a write transaction, PDT bridge continues transferring data from its write FIFO to the target device.

In step 309, as processing continues, the PDT bridge issues a retry to the initiator to free the PCI bus. This allows the PCI bus to be used by other initiators while the PDT bridge continues the transaction with the high latency target.

In step 310, in the case where the target i s not a high la tency targe t, the PDT bridge immediately completes the transaction without issuing a retry. Upon completion of the transaction, the PCI bus is available for use by other initiators.

Figure 4:
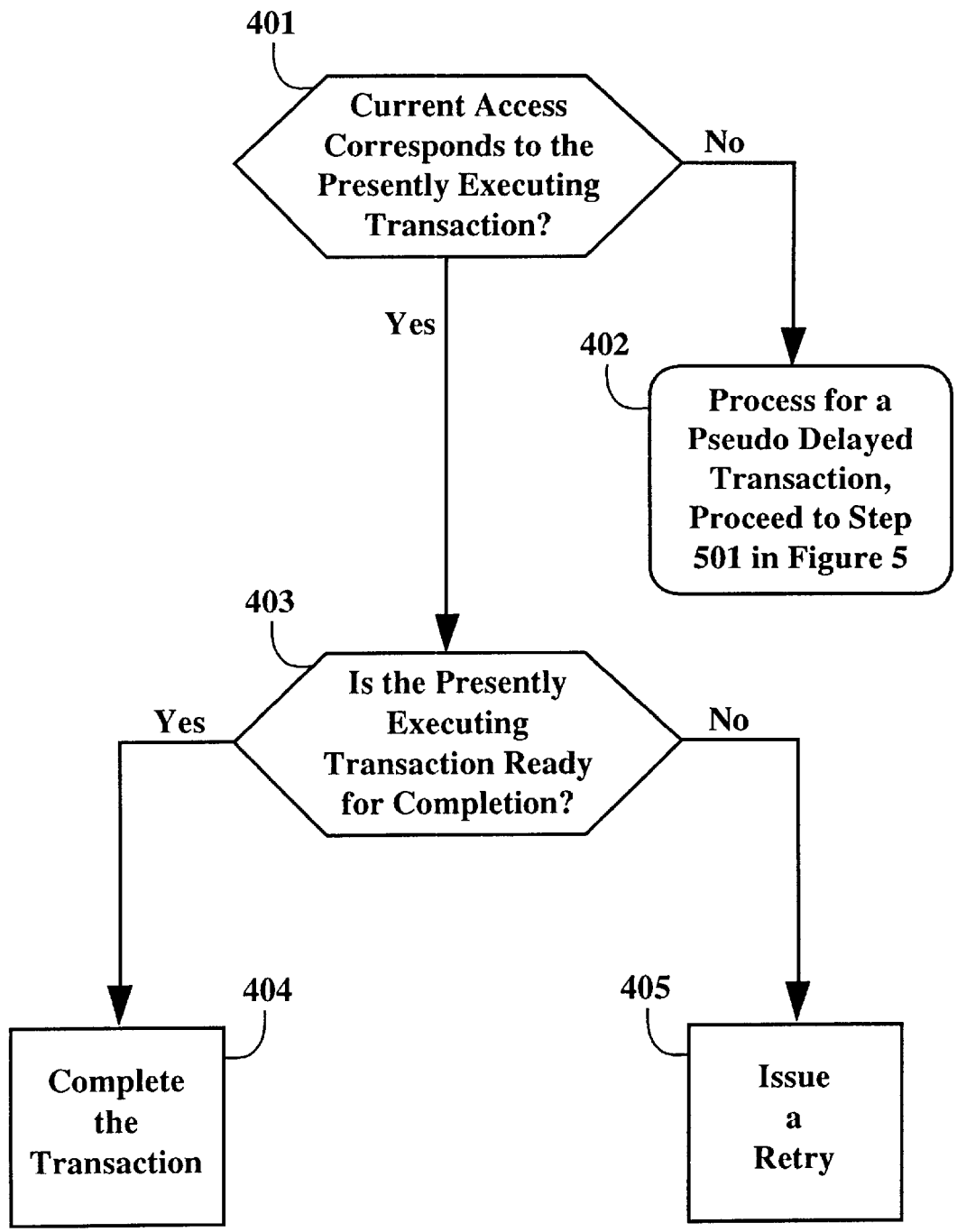
FIG. 4 shows additional steps of the process from FIG. 3.

With reference now to FIG. 4, steps 401 through 405 of process 300 are shown. As described above, process 300 proceeds to step 401 when the PDT bridge receives an access from an initiator while it is busy processing a previous transaction (e.g., the presently executing transaction) as described in step 302.

In step 401, the PDT bridge determines whether the current access corresponds to the presently executing transaction. As described above, if a transaction is a high latency transaction, the initiator for the transaction is retried while the PDT bridge continues working on the transaction. Hence, the PDT bridge checks the current initiator to determine if the presently executing transaction "belongs" to it.

The PDT bridge examines the queued grant signal outputs (however, at this step, the PDT bridge could alternatively check the address/byte enable signals). If the current initiator corresponds, process 300 proceeds to step 403. If the current initiator does not correspond, process 300 proceeds to step 402.

In step 402, if the current initiator does not correspond, the current initiator is processed for a pseudo delayed transaction in accordance with the present invention. From step 402, process 300 proceeds to step 501 of FIG. 5 (described below).

In step 403, if the current initiator does correspond, the PDT bridge determines whether the presently executing transaction is ready for completion. If the transaction is ready (e.g., the requested data has been fetched from the target), process 300 proceeds to step 404 and the transaction is completed. If the transaction is not ready, process 300 proceeds to step 405 and another retry is issued to the current initiator.

Figure 5:
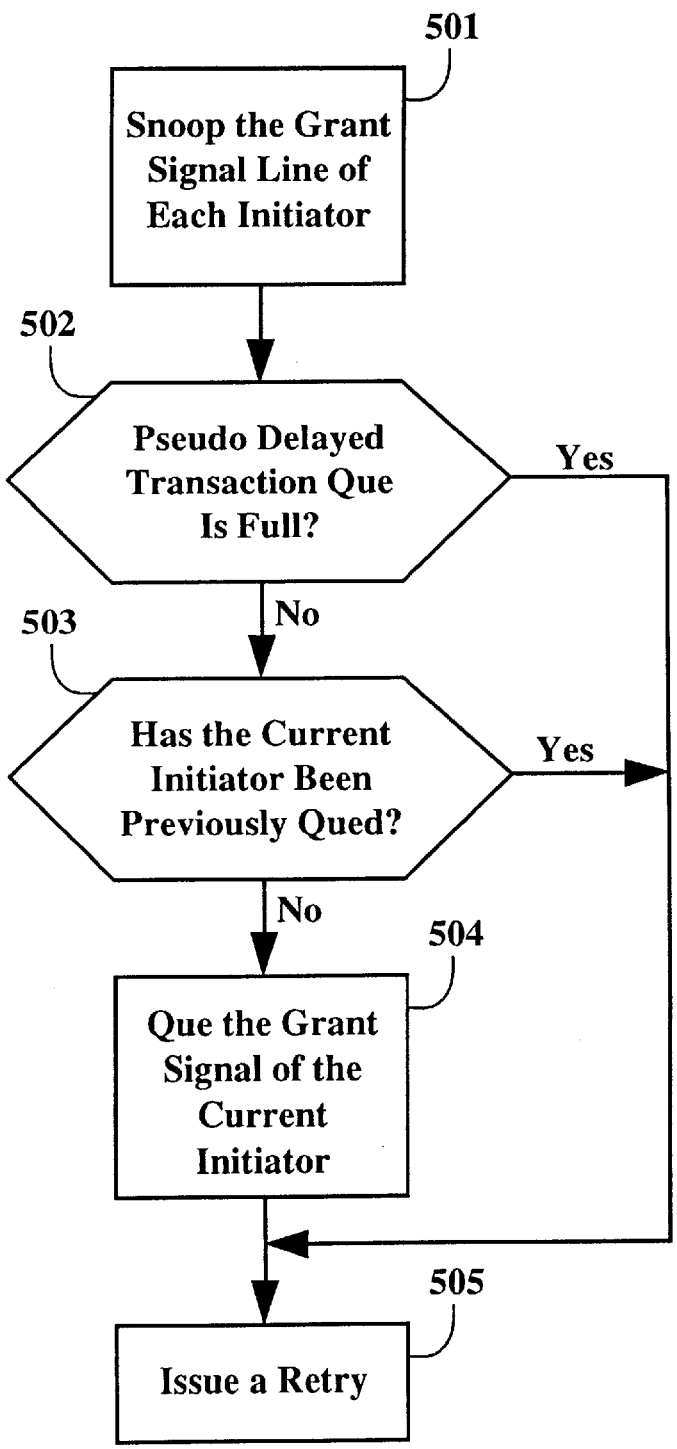
FIG. 5 shows more steps of the process from FIG. 3.

With reference now to FIG. 5, steps 501 through 505 of process 300 are shown. As described above, process 300 proceeds to step 501 from step 402 where the current initiator does not correspond to the presently executing transaction and the current initiator is to be processed for a pseudo delayed transaction.

In step 501, the PDT bridge continually snoops the grant signal line for each initiator coupled to the PCI bus. This allows the PDT bridge to uniquely identify the current initiator.

In step 502, the PDT bridge determines whether a pseudo delayed transaction queue included within the PDT bridge is full. As described above, the PDT bridge queues the access of the current initiator pending completion of the presently executing transaction. In the present embodiment, process 300 supports multiple pseudo delayed transactions for multiple initiators. If the number of supportable pseudo delayed transactions is not exceeded (e.g., the queue is not full), process 300 proceeds to step 503. If the number of supportable pseudo delayed transactions is exceeded, process 300 proceeds to step 505 and the current initiator is issued a retry.

In step 503, if the current initiator is already stored in the queue, the PDT does not store another corresponding entry in the queue Accordingly, process 300 proceeds to step 505 and issues a retry. However, if the current initiator is not already stored in the queue, process 300 proceeds to step 504.

In step 504, the PDT bridge queues the grant signal of the current initiator, in the manner described above. In so doing, the PDT bridge ensures the current initiator is given preference when the presently executing transaction is completed. This ensures the current initiator will not be starved of access to the devices on the subordinate bus. Process 300 subsequently issues the current initiator a retry in step 505.

Thus, the present invention comprises a method and system for supporting delayed transactions without incurring the increased complexity and expense associated with the prior art. The system of the present invention allows fair access to devices on one side of a bridge by devices on the opposite side of the bridge. The system of the present invention does not allow a device on one side of the bridge to be starved of access to devices on the other side of the bridge. In addition, the system of the present invention provides its benefits without requiring a large amount of implementing logic. The present invention and its benefits are further described below.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system having a plurality of busses coupled by a bridge, a system for implementing pseudo delayed transactions between devices coupled to busses on either side of the bridge, comprising:
    a first initiator coupled to a first bus, said first initiator adapted to request ownership of said first bus and receive a first grant signal from an arbiter responsive thereto;
    a second initiator coupled to said first bus, said second initiator adapted to request ownership of said first bus and receive a second grant signal from said arbiter responsive thereto;
    a target device coupled to a second bus; and
    a bridge coupled to said first bus and said second bus for implementing data transactions between said target device and said first initiator or said second initiator, said bridge adapted to store said second grant signal to support a pseudo delayed transaction by said second initiator when said bridge is busy executing a current transaction from said first initiator to said target device such that said second device is guaranteed access to said target device, wherein said bridge stores said second grant signal and does not store address or command/byte enable signals from said second initiator to support said pseudo delayed transaction.

2. The system of claim 1, wherein said first bus is a PCI (peripheral component interconnect) bus and said first initiator and said second initiator comply with PCI specifications.

3. The system of claim 1, wherein said bridge snoops a first grant signal line for said first initiator and a second grant signal line for said second initiator to receive said first grant signal and said second grant signal.

4. The system of claim 1, wherein said bridge includes a queue for storing said first grant signal or second grant signal.

5. The system of claim 1, wherein said bridge queues said second grant signal when said bridge is accessed for a transaction by said second initiator and said bridge is busy executing said current transaction.

6. The system of claim 1, wherein said bridge issues a retry to said second initiator when accessed for a transaction by said second initiator and said bridge is busy executing said current transaction.

7. The system of claim 1, wherein said pseudo delayed transaction for said second initiator is executed after said current transaction for said first initiator is completed and said second initiator accesses said bridge.

8. The system of claim 1, wherein said first bus is a PCI bus and said second bus is a PCI bus and said first initiator, said second initiator, and said target comply with PCI specifications.

9. The system of claim 1, wherein said second bus is a proprietary, non-industry standard bus.

10. In a computer system having a first and second bus coupled by a bridge, a system for implementing pseudo delayed transactions between initiator devices coupled to the first bus and a target device coupled to the second bus, comprising:

a first initiator coupled to a first bus, said first initiator adapted to request ownership of said first bus and receive a first grant signal from an arbiter responsive thereto;

a second initiator coupled to said first bus, said second initiator adapted to request ownership of said first bus and receive a second grant signal from said arbiter responsive thereto, wherein said first bus is a PCI (peripheral component interconnect) bus and said first initiator and said second initiator comply with PCI specifications;

a target device coupled to a second bus; and a bridge coupled to said first bus and said second bus for implementing data transactions between said target device and said first initiator or said second initiator, said bridge adapted to store said second grant signal to support a pseudo delayed transaction by said second initiator when said bridge is busy executing a current transaction from said first initiator to said target device, wherein said pseudo delayed transaction is executed after said current transaction for said first initiator is completed and said second initiator accesses said bridge such that said second device is guaranteed access to said target device, wherein said bridge stores said second grant signal and does not store address or command/byte enable signals from said second initiator to support said pseudo delayed transaction.

11. The system of claim 10, wherein said bridge snoops a first grant signal line for said first initiator and a second grant signal line for said second initiator to receive said first grant signal and said second grant signal.

12. The system of claim 10, wherein said bridge includes a queue for storing said first grant signal or second grant signal.

13. The system of claim 10, wherein said bridge is accessed for a transaction by said second initiator and said bridge is busy executing said current transaction.

14. The system of claim 10, wherein said bridge issues a retry to said second initiator when accessed for a transaction by said second initiator and said bridge is busy executing said current transaction.

15. The system of claim 10, wherein said second bus is a PCI bus.

16. The system of claim 10, wherein said first bus is a PCI bus and said second bus is a non-PCI bus.

17. In a computer process having a first and second bus coupled by a bridge, a process for implementing pseudo delayed transactions between a first and second initiator devices coupled to the first bus and a target device coupled to the second bus, the process comprising the steps of:

a) receiving a first access from said first initiator to said bridge to obtain access to said target;

b) executing a current data transaction from said first initiator to said target via said bridge;

c) receiving a second access from said second initiator to said bridge to obtain access to said target;

d) issuing a retry to said second initiator when said bridge is busy executing said current data transaction;

e) storing a grant signal for said second initiator to queue said second initiator to support a pseudo delayed transaction for said second initiator and not storing address or command/byte enable signals from said second initiator;

f) receiving a third access from said second initiator to said bridge to access said target; and g) executing said pseudo delayed transaction for said second initiator when said bridge is finished with said current transaction such that said second initiator is guaranteed access to said target.

18. The process of claim 17, further including the step of snooping a grant signal line for said second initiator to receive said grant signal, wherein said first bus is a PCI bus and said first and second initiators are PCI initiators.

19. The process of claim 17, further including the step of snooping a grant signal line for said second initiator to receive said grant signal, where in said first bus is a PCI bus and said second bus is proprietary non-industry standard bus.

20. The process of claim 17, wherein step e) includes storing said grant signal within said bridge to queue said second initiator for a pseudo delayed transaction.

21. In a computer system having first and second PCI (peripheral component interconnect) busses coupled by a bridge, a system for implementing pseudo delayed transactions between devices coupled on either side of the bridge, comprising:

a first initiator coupled to said first bus, said first initiator adapted to request ownership of said first bus and receive a first grant signal from an arbiter responsive thereto;

a second initiator coupled to said first bus, said second initiator adapted to request ownership of said first bus and receive a second grant signal from said arbiter responsive thereto;

a target device coupled to a second bus; and a bridge coupled to said first bus and said second bus for implementing data transactions between said target device and said first initiator or said second initiator;

said bridge adapted to support a pseudo delayed transaction, wherein said bridge does not retain ownership of said first bus when executing said pseudo delayed transaction, by said second initiator when said bridge is busy executing a current transaction from said first initiator to said target device by:

snooping a first grant signal line for said first initiator and a second grant signal line for said second initiator to receive said first grant signal and said second grant signal;

storing said first grant signal or second grant signal to identify subsequent accesses by said first initiator or said second initiator; and executing said pseudo delayed transaction for said second initiator after said current transaction for said first initiator is completed and said second initiator performs a subsequent access to said bridge such that said second initiator is guaranteed access to said target device.

22. The system of claim 21, wherein said bridge stores said second grant signal and does not store address or command/byte enable signals from said second initiator to support said pseudo delayed transaction.

23. The system of claim 21, wherein said bridge issues a retry to said second initiator when accessed for a transaction by said second initiator and said bridge is busy executing said current transaction.

\* \* \* \* \*